H. CLAUSEN, G. W. WUNDRAM & G. C. CLAUSEN.
Process and Apparatus for Treating Hops and Malt Extract.
No. 218,231.        Patented Aug. 5, 1879.
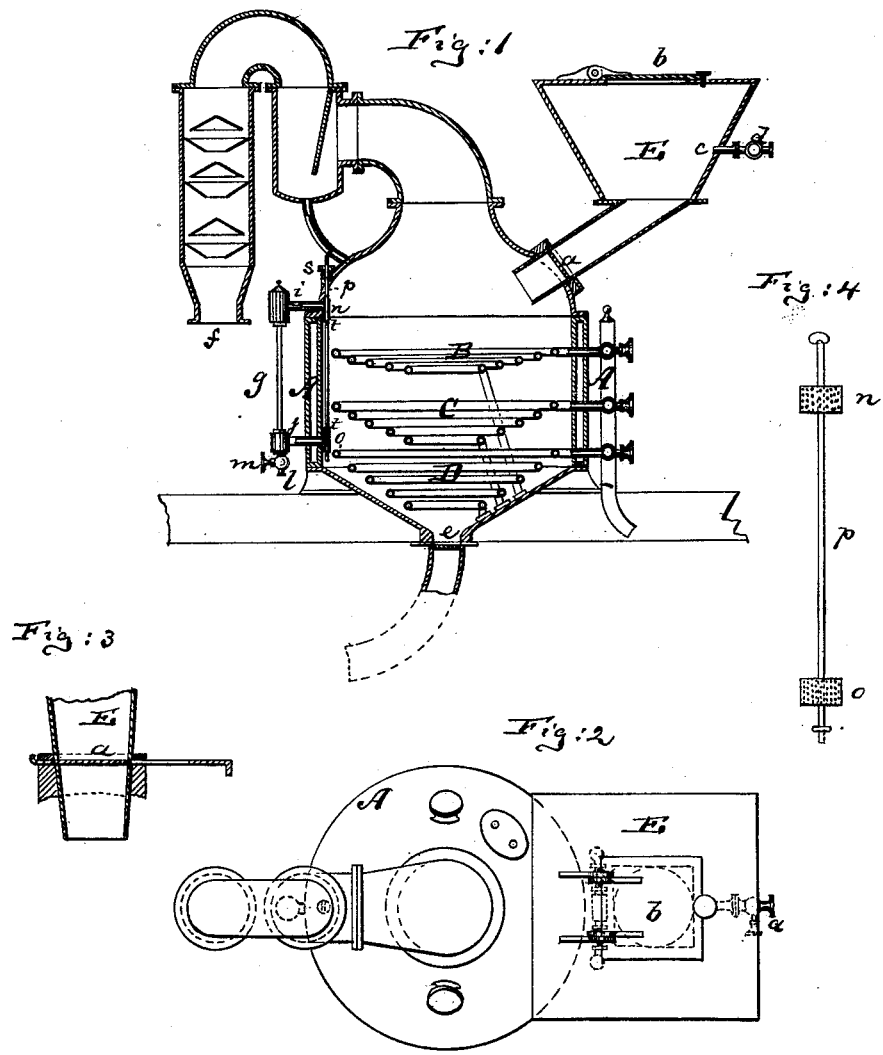
Witnesses:
John C. Tunbridge
T. B. Mosher
Inventors:
Henry Clausen
George W. Wundram
George C. Clausen
by their attorney
A. v. Briesen

UNITED STATES PATENT OFFICE.

HENRY CLAUSEN, OF NEW YORK, N. Y., GEORGE W. WUNDRAM, OF JERSEY CITY HEIGHTS, N. J., AND GEORGE C. CLAUSEN, OF NEW YORK, N. Y.

IMPROVEMENT IN PROCESSES AND APPARATUS FOR TREATING HOPS AND MALT EXTRACTS.

Specification forming part of Letters Patent No. 218,231, dated August 5, 1879; application filed December 21, 1878.

*To all whom it may concern:*

Be it known that we, HENRY CLAUSEN, of New York city, county and State of New York, GEORGE W. WUNDRAM, of Jersey City Heights, county of Hudson, and State of New Jersey, and GEORGE C. CLAUSEN, of New York city, county and State of New York, have invented an Improved Process of Treating Hops and Malt Extracts and Apparatus for same, of which the following is a specification.

Figure 1 is a vertical central section of our improved apparatus. Fig. 2 is a top view of same. Fig. 3 is a detailed longitudinal section of slide in end of hopper. Fig. 4 is a detail face view of the slide leading to gage.

Similar letters of reference indicate corresponding parts in all the figures.

This invention relates to a new method of treating malt extract and hops in the manufacture of beer, and to a new apparatus for carrying the same into effect; and consists, first, in treating the malt extract and the hops in a vacuum-pan which has separate channels for admitting the malt and the hops; also, in the new construction and arrangement of vacuum-pan hereinafter described.

In the accompanying drawings, the letter A represents a vacuum-pan of suitable construction. B C D are coils of steam or hot-water pipe, which enter the vacuum-pan for the purpose of heating the contents thereof. E is a hopper for the supply of hops. It enters the pan A, as shown, and has a slide, *a*, by means of which its communication with the vacuum-pan can be interrupted. The top of the hopper can be closed by a lid, *b*. At one side the hopper has an air-opening, *c*, which can be closed by a suitable cock, *d*.

The vacuum-pan has an opening, *e*, through which the malt extract is supplied to it. At *f* a pump is applied to the neck of the pan for the purpose of creating a vacuum therein.

*g* is a glass gage applied to the vacuum-pan, and connected to the upper and lower parts thereof by means of branch pipes *i* and *j*, respectively. This gage indicates the height and condition of the liquid in the pan. Its contents may be discharged through an opening at *l* that can be closed by a cock, *m*.

In order to prevent hops from entering the gage *g*, and from clogging the pipes *i* and *j*, we place perforated plates *n* and *o* against the inner ends of said pipes, respectively, and unite said plates by a rod, *p*, that extends through a stuffing-box, *s*, in the wall of the vacuum-pan. The plates *n* and *o* are held in suitable guides *t*, that are secured within the vacuum-pan. In these guides the plates can slide up and down when moved by the rod *p*.

The liquid and gaseous contents of the vacuum-pan can pass into the gage *g* through the sieve-like plates *n o* and pipes *i j*; but the hops cannot pass through the plates. Should particles of hops clog the openings in the plates the latter are moved up and down and agitated until freed from the obstruction.

The apparatus operates as follows: The pump having created a proper vacuum the malt extract is admitted to the pan through the opening *e* by means of a suitable pipe leading thereto. The opening *e* is then closed by a suitable slide or valve. Heated water or steam is conducted through the coils B C D, and causes the malt extract to boil. In the vacuum-pan a temperature of 130° Fahrenheit will suffice to boil the malt extract. At the proper time a charge of hops is placed into the hopper E, and the slide *a* is then opened, and also the cock *d*, whereupon the contents of the hopper are sucked into the pan to be properly boiled with the malt extract. Thereupon the slide *a* and cock *d* are again closed to fit the hopper for the reception of a new charge. After the contents of the vacuum-pan have been sufficiently boiled they are discharged either through the opening *e* or through any other suitable opening made for that purpose in the pan A.

In lieu of the hopper E a sliding perforated screen containing the hops may be used and slid into the pan, with the contents to be boiled, and then again partly drawn out with its contents. This would prevent the hops from bodily entering the beer that is discharged from the vacuum-pan.

The object of boiling the hops in malt extract is to produce a beverage known as "beer," in the manufacture of which it is necessary to boil the hops within the extract of malt previously obtained.

We are aware that wort has already been boiled in vacuo, and do not claim this; but all wort or malt extract after having been boiled must be again boiled with the hops in order to produce beer. The boiling of hops in the wort has never yet taken place in a vacuum-pan, and heretofore there was no vacuum-pan in which it could be done. By boiling the hops and malt extract together in the vacuum-pan much less heat is required, and a finer flavor obtained than when the boiling takes place in ordinary vessels under excessive heat and subject to unlimited evaporation. The vacuum-pan employed by us has a series of condensing-plates in its discharge-neck, as indicated in Fig. 1, for the purpose of condensing the vapors that would otherwise be exhausted, and leaving them within the beer. The essence is, within the vacuum-pan, much more rapidly extracted from the hops than it could be in an ordinary vessel, and the reboiling of the wort is consequently less excessive than it otherwise would be. The object of boiling under our process is to extract the volatile oils from the hops and incorporate them in the malt extract. The more rapidly this is effected the more perfectly will the characteristic properties of the malt extract be preserved, and the finer flavored will consequently be the resulting beverage. Thus but from ten to fifteen minutes will be required to incorporate the aroma of a suitable charge of hops in about one hundred gallons of malt extract contained and boiled within the vacuum-pan. Heretofore at least from sixty to ninety minutes were required for this treatment of the hops, during which time the volatile oils have had ample opportunity to evaporate and to escape, whereas we carry on the boiling after the introduction of the hops for a period so brief that it will just suffice to extract the aroma without giving it an opportunity to escape.

We claim—

1. In the manufacture of beer, the process herein described of extracting the desirable flavor from hops and incorporating the flavor with the wort, which consists, after boiling the wort in a vacuum-pan, in adding thereto the hops, and boiling the wort and the hops conjointly within said vacuum-pan for a limited time, substantially as specified.

2. The vacuum-pan constructed with two separate channels for the admission of malt and hops, and with but a single outlet for the removal of air, substantially as herein shown and described.

3. The vacuum-pan A, combined with the hopper E, having slide or gate a, air-opening c, and cock d, substantially as herein shown and described.

4. The combination of the movable perforated plates n and o with the vacuum-pan A, pipes i and j, gage g, and rod p, substantially as herein shown and described.

HENRY CLAUSEN.
   G. W. WUNDRAM.
   GEORGE C. CLAUSEN.

Witnesses:
 F. V. BRIESEN,
 J. TURK.